(12) United States Patent
Strazhgorodskiy

(10) Patent No.: US 8,201,804 B2
(45) Date of Patent: Jun. 19, 2012

(54) APPARATUS FOR UNINTERRUPTED FLUSHING A WELL BORE

(76) Inventor: Semen J Strazhgorodskiy, Los Gatos, CA (US)

( * ) Notice: Subject to any disclaimer, the term of this patent is extended or adjusted under 35 U.S.C. 154(b) by 590 days.

(21) Appl. No.: 12/383,598

(22) Filed: Mar. 26, 2009

(65) Prior Publication Data

US 2009/0242817 A1    Oct. 1, 2009

Related U.S. Application Data

(60) Provisional application No. 61/072,117, filed on Mar. 28, 2008.

(51) Int. Cl.
*F16K 25/00* (2006.01)
(52) U.S. Cl. ............. 251/183; 251/315.13; 137/625.41
(58) Field of Classification Search .............. 251/174, 251/176, 180, 181, 183, 192, 315, 315.13, 251/314, 315.16; 137/315.19, 625.4, 625.41, 137/625.46, 625.47
See application file for complete search history.

(56) References Cited

U.S. PATENT DOCUMENTS

| | | | |
|---|---|---|---|
| 1,491,986 A | 4/1924 | Green | |
| 2,158,356 A | 5/1939 | Dyer | |
| 2,442,548 A * | 6/1948 | Mueller | 166/76.1 |
| 2,894,715 A * | 7/1959 | Bostock | 251/58 |
| 3,036,590 A * | 5/1962 | Knox | 137/315.02 |
| 3,298,385 A | 1/1967 | Jackson | |
| 3,743,015 A * | 7/1973 | Mott | 166/113 |
| 3,897,822 A * | 8/1975 | Mott | 166/72 |
| 4,293,163 A * | 10/1981 | Braddick | 251/283 |
| 4,660,596 A * | 4/1987 | Ashford | 137/496 |
| 4,854,383 A * | 8/1989 | Arnold et al. | 166/70 |
| 4,871,019 A * | 10/1989 | Haley et al. | 166/167 |
| 5,246,203 A * | 9/1993 | McKnight et al. | 251/315.01 |
| 5,338,001 A * | 8/1994 | Godfrey et al. | 251/58 |
| 5,628,493 A * | 5/1997 | McKnight et al. | 251/288 |
| 7,308,952 B2 | 12/2007 | Strazhgorodskiy | |
| 7,409,966 B2 * | 8/2008 | Chang | 137/625.47 |
| 7,712,724 B2 * | 5/2010 | Thomas | 251/314 |
| 7,726,418 B2 * | 6/2010 | Ayling | 175/241 |
| 2010/0300543 A1 * | 12/2010 | Braddick | 137/1 |

FOREIGN PATENT DOCUMENTS

GB     2 427 217    10/2008

* cited by examiner

*Primary Examiner* — John Fristoe, Jr.
*Assistant Examiner* — Matthew W Jellett

(57) ABSTRACT

The apparatus for uninterrupted flushing a well bore being drilled with a jointed drill string comprises a continuous flushing valve (CFV) and a connector for temporarily attaching a bypass line to the valve. The CFV is a ball-type three way valve in a housing adapted for including in the drill string. Inside the housing there are two axial and two side sealing seats which provide for flow only through designated paths. The plug is prevented from loosening by a spring. An operating stem is mounted to operate the valve by a wrench from outside the housing. A connector facilitates fast tying a hose of a bypass line to the side port. A securing mechanism keeps a valve ball in full open position while a CFV is in the well.

5 Claims, 4 Drawing Sheets

APPARATUS FOR UNINTERRUPTED FLUSHING A WELL BORE

CROSS-REFERENCE TO RELATED APPLICATION

The present application claims the benefit of the earlier filing date of provisional application No. 61/072,117 filed Mar. 28, 2008, and entitled "An Apparatus for uninterrupted flushing a well bore".

BACKGROUND OF INVENTION

1. Field of the Invention

The invention relates to apparatus for drilling a well bore into the earth using a system comprising a drilling rig with a top drive/kelly or a downhole motor for rotating the drill string comprising interconnected joints of drill pipe. More close, it relates to apparatus for uninterrupted flushing a well bore while a drill pipe joint is being added to or removed from drill string. More particularly it relates to apparatus in systems which use for uninterrupted flushing a plurality of valves being included in the drillstring for temporarily bypassing flushing fluid flow while making a connection.

2. Description of Related Art

In drilling, as the operation continues, it is necessary to add sections of drill pipe, during which time in conventional drilling circulation of drilling fluid must be discontinued. It leads to several complications in the well bore and lost of time.

For many years drilling industry is working on technical solutions which could provide for uninterrupted flushing a well bore while making a drill string connection.

The known continuous circulation methods and apparatus comprise two main groups.

The first group deploys a plurality of continuous flushing valves also referred to as "drill string couplings," "continuous circulation subs", "continuous circulation valves". The second group deploys for continuous circulation a dividable chamber sealed around drill pipe as it is disclosed in U.S. Pat. No. 3,559,739 to Hutchison.

The present invention relates to the first group.

U.S. Pat. No. 1,491,986 to Greene discloses a valve assembly, a continuous circulation coupling comprising housing adopted for including in the drill string as a sub such that every stand receives a valve assembly. A hinged flapper valve with two seats is placed inside the housing. The housing has a threaded side opening. The arrangement is such that the flap valve will normally cover the side opening but may pivot to close axial channel of the valve. Normally the side opening is covered with a plug. When it comes to making a connection, the plug is unscrewed from the valve body and a bypass line (a hose) is screwed into the side opening (side port). By operating appropriate valves on surface lines the direction of circulation is changed. Now the drilling fluid flows from the side port. Axial channel above the side port is sealed by the flap. The driving mechanism is disconnected from the drill string. A new drill pipe stand is added to the drill string. Again, by operating appropriate valves the flow of the drilling fluid is diverted to normal axial direction; the bypass line is disconnected; the side port is sealed with the plug; and drilling is resumed.

U.S. Pat. No. 2,158,356 to Dyer discloses some new features to the design of the flapper valve.

U.S. Pat. No. 3,298,385 to Jackson et.el. ("Constant circulating coupling device") pointed at a number of disadvantages inherent in the continuous circulating sub of the patent . . . 356. Patent . . . 385 discloses a continuous circulating sub with a one piece housing; a removable flapper valve; a bayonet-type lock between side port and bypass line and between the side port and a plug.

UK patent GB 2 427 217 to Calderoni et. el. discloses a device which uses the same operational process as the devices of the above cited patents. But the device of the patent . . . 217 has two valves. Valve A closes and opens a side port. Valve B closes and opens the axial channel. In preferred embodiment, the valves are flapper-type (named in the patent "throttle"). No specifics concerning side port connecting mechanism and a plug ("safety plug") of the side port are disclosed or claimed.

An important issue with continuous flushing devices which deploy flapper-type valves is that drilling fluids flow through open seats of the valve. If drilling fluid is a mud composed of clay, barite, loss circulation additives these materials unevenly deposit on sealing surfaces. It may lead to partial closure of the valve, leaks, complications while drill string connection process and unsafe conditions on the rig floor.

U.S. Pat. No. 7,308,952 to Strazhgorodskiy discloses a system for continuously flushing a wellbore while drilling and making drill string connections with direct or reverse circulation of a drilling fluid or with a formation fluid being produced through the drill string. The continuous flushing system of the . . . 952 deploys a ball valve. But the ball valve in preferred embodiment of . . . 952 may be difficult to manufacture and maintain. In addition, the valve of . . . 952 lacks a feature which would exclude unwonted movements of the valve ball while drilling.

The incessant for almost hundred years, but with a few practical results, attempts to develop reliable apparatus for continuously flushing wells while making drill string connections, show the importance of the technology for the industry.

3. Objects and Advantages

An object of present invention is to provide an apparatus for continuously flushing a well bore while making drill string connections. More specifically, the apparatus using a ball-type valve which provides the possibility to drill with direct or reverse circulation, is contained in full open position while being in the well, has convenient means for connecting a bypass line to the side port, and which has supplementary safety features.

SUMMARY OF THE PRESENT INVENTION

The apparatus of the invention comprises at least one continuous flushing valve (CFV) and a connector for temporarily attaching a line to the valve.

The CFV has a housing adopted for including in a drill string as a sub. A three-way ball valve assembly is mounted inside the housing. The housing has a threaded side opening, which constitutes the side port of the valve.

Inside the housing there are two axial and two side sealing seats which provide for flow only through designated paths. There are also some additional sealing means.

An operating stem is mounted to operate the valve by a wrench from outside the housing. By rotating the stem the valve ball may be put in three positions, each of the positions providing two flow patterns.

In first position a fluid may flow up and down through the valve. In the second position fluid may flow from side port downwards, and in the opposite direction. The third position provides for flow downwards to the side port and vice versa.

For connecting a conduit, usually a hose, to the side port a special connector is provided. The connector comprises means which allow rotating a connecting pipe of connector while the hose is not rotating.

While a CFV is in the well bore the side port is closed by the ball valve. A plug redundantly seals the side port. The plug has a thread which fits the thread of the side port of CFV, and sealing means which comprise O-rings. The plug is prevented from loosening by a spring or other means known in the art.

It is not supposed to be, but a small volume of pressurized fluid may accumulate in space between the ball and plug. To avoid an injury with the plug, volume of space below the plug is minimized by the form and length of the plug. An additional safety feature is provided with means for releasing the pressure. The means comprise a venting channel. The venting channel may be a grove cut through part of the thread of the plug.

For making the process of connecting and disconnecting a hose to and from the side port of the valve physically easier and safer, the connector may be mounted on a cart. The cart takes the load of the connector and adjacent part of the hose. The cart comprises known in the art means for adjusting its height such that connecting pipe may be placed in an appropriate position.

While drilling a well bore the drill string is subjected to strong vibration. A securing mechanism is provided for preventing the ball valve from rotating under vibration forces. The securing mechanism comprises a short stem at the bottom of the plug and a notch at the surface of the ball valve. When the plug is screwed into side port closed by the valve ball, plug's locking stem is placed into the notch of the ball.

Making a connection with CFV in drilling with direct circulation comprises follow steps. The upper most CFV is placed above rotary table. The side port plug is unscrewed. A bypass line is connected to the side port and pressurized with drilling fluid. The valve ball of the CFV is put in the second position to permit the flow of drilling fluid from the bypass line. Flow of drilling fluid from the main line is discontinued. Rotating mechanism is disconnected from drill pipe. New drill pipe stand, generally with a CFV at its head, is added to drill string and pressurized with drilling fluid. The valve ball is turned into the first position. Drilling fluid flow from the bypass line is discontinued. Bypass line is disconnected from the side port. The plug is put in place. Drilling resumes.

BRIEF DESCRIPTION OF DRAWINGS

The invention is illustrated in the accompanying drawing in which.

DETAILED DESCRIPTION

The present invention relates to apparatus in systems which use for uninterrupted flushing a plurality of three-way ball valves being included in the drillstring for temporarily bypassing flushing fluid flow while making a drill string connection.

Figure 1:
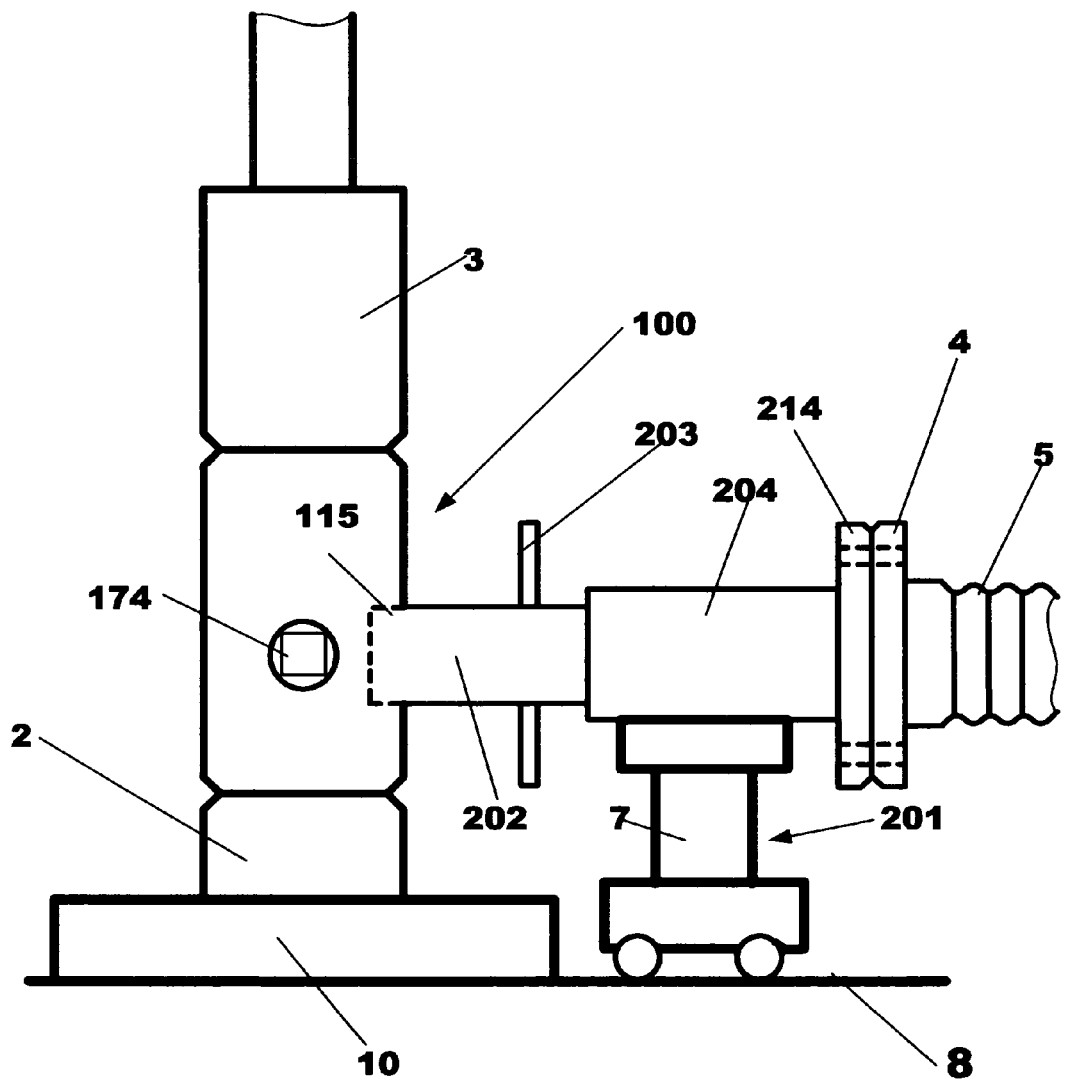
FIG. 1 is a general view of the Apparatus

Referring to FIG. 1, there is a general view of the apparatus in position after a drill pipe joint is added to the drill string. A continuous flushing valve (CFV) 100 is connected to the uppermost pipe joint 2 of the drillstring. A new drill pipe joint 3 is connected to CFV 100. A bypass line (hose) 4 with flange 5 is connected to a side port 115 via a connector 200. The connector 200 comprises a first pipe 202 with a handle 203 and a second pipe 204.

The connector 200 is mounted on a cart 201. The cart has means 7 for adjusting its height and may be moved on rig floor 8 to and from rotary table 10.

Figure 2:
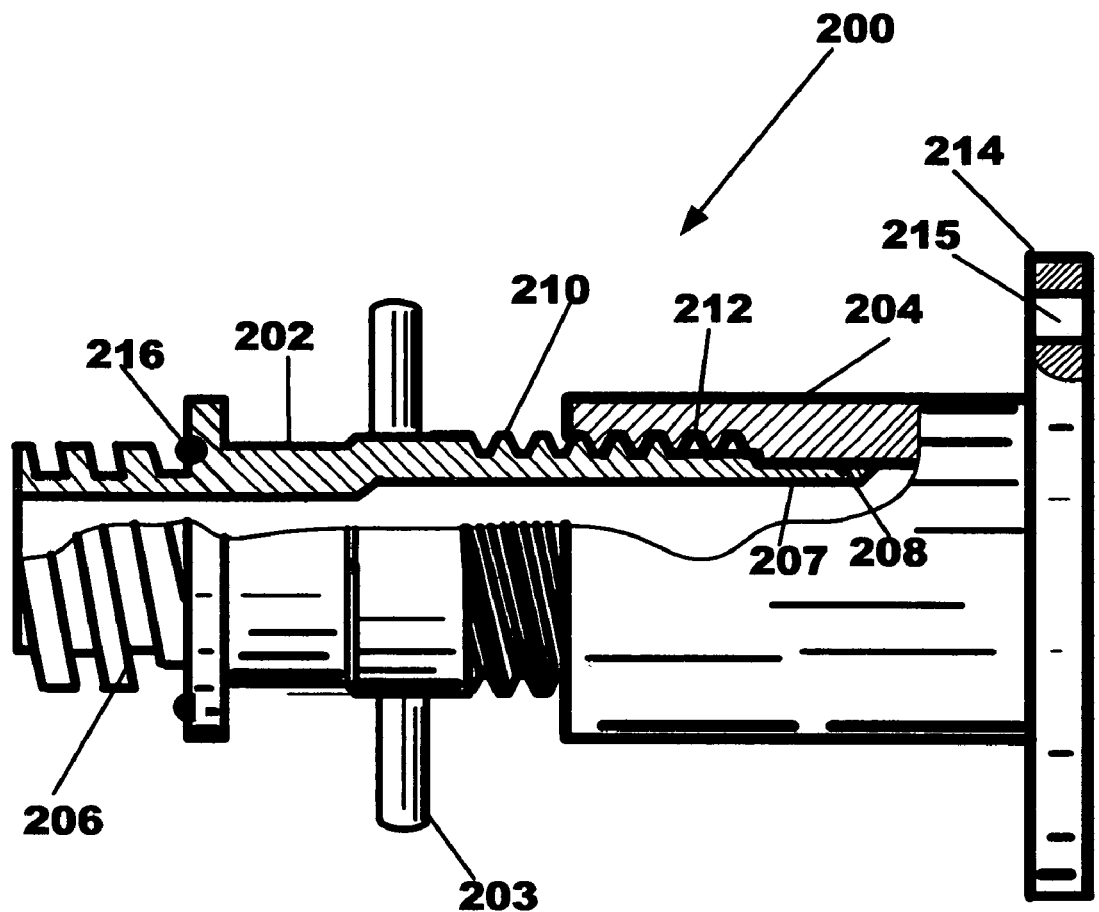
FIG. 2 is a partially sectional view of a connector

FIG. 2 shows a connector 200 in more inclusive form. A pipe 202 has threaded end 206 which fits threaded side port 115 of the continuous flushing valve (FIG. 1). O-ring 216 seals the connection. There is an outside threaded middle part 210 of the pipe 202. A part 207 of the pipe 202 is not threaded, has an O-ring 208 and may slide inside a pipe 204. The pipe 204 has an inside threaded end 212 which fits thread 210 of the pipe 202. A flange 214 has a plurality of bolt openings 215 for connecting with a flange of a hose.

The pipe 202 is being screwed or unscrewed into or from the side port by rotating the pipe 202 with a handle 203. The pipe 202 rotates inside the pipe 204. The pipe 204 does not rotate.

Figure 3:
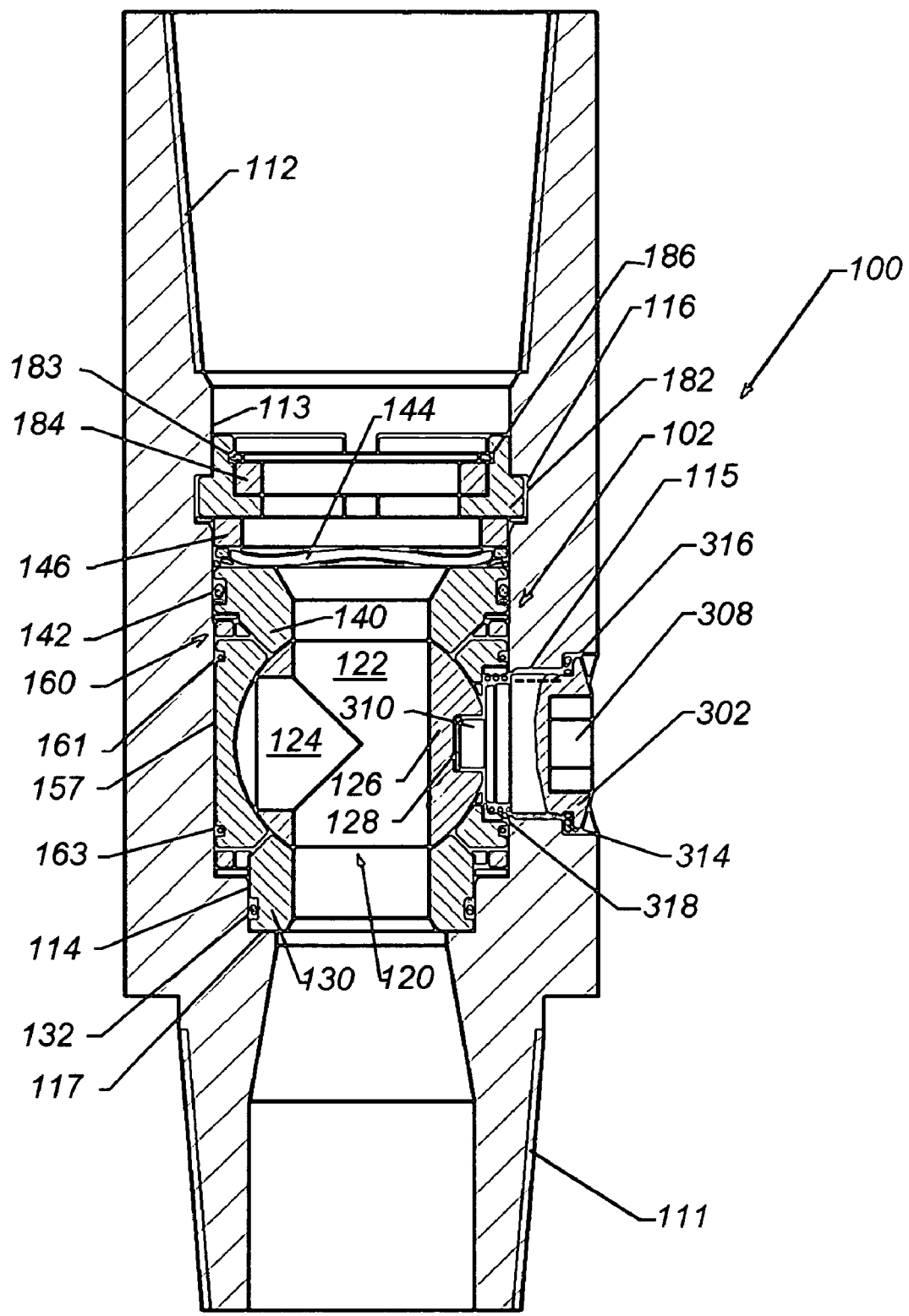
FIG. 3 is a sectional view of a continuous flushing valve

FIG. 3 is a cross-sectional view of the continuous flushing valve (CFV) 100. The major components of the CFV 100 are a housing 110, a valve ball 120, a lower seat assembly 130, an upper seat assembly 140, an open side seat (open cheek) 150, a side seat (death cheek) 155, a holder 160, a locking assembly 170, and a plug assembly 300.

The housing 110 is designed as a sub with threaded pin 111 and box 112 ends which fit drill pipe connections. The housing 110 includes an upper passage section 113 and a lower passage section 114 with a shoulder 117, a threaded hole of side port 115, and a recess 116.

The valve ball 120 has an axial (through) hole 122 and a transverse hole 124. The holes 122, 124 form two connected cylindrical passages, a conventional combination for 3-way ball type valves. The valve ball has a closing sector 126 with a notch 128.

The cheeks 150,155 and the valve ball 120 are mounted together by a holder 160. The assembly is kept in place with spring rings 161 and 163 which fit into appropriate groves.

The force of a wave spring 144 applies to the upper seat 140 120 and helps to keep the valve ball 120 in sealing contact with the upper seat 120 and the lower seat 130.

Those having ordinary skill in the art will appreciate that other biasing mechanisms, such as Bellville washers, helical springs, and elastomeric material, may be used instead of a wave spring without departing from the scope of the present invention.

An O-ring 132 is placed into a groove to seal around the lower seat 130. An O-ring 142 is placed into a groove to seal the around the upper seat 140. The O-rings 132, 142 prevent fluid from bypassing the ball valve assembly into or from the upper passage section 113 and a lower passage section 114.

Outer surfaces of the cheeks 150 and 155 correspond (fit) to the surface of the cylindrical section 113 of the housing 110 to provide sealing contacts.

A threaded side port 115 may be sealed with a plug assembly 300 or it may be used for temporarily securing the first pipe 202 of the connector 200 as it is shown on FIG. 1.

The plug assembly 300 may comprise a threaded plug 302, a wrench opening 308, a venting grove 316, an O-ring 314, a locking stem 310. When the plug is screwed into the opening 115 of the side port the closing part 126 of the valve ball 120 is in position against side port. The stem 310 is placed into locking opening 128 of the valve ball to secure its position. The opening 152 of the open cheek 150 (FIG. 4) is sealed by the closing part 126 of the valve ball 120. Multiple sealing barriers of the valve assembly 102, disclosed above, provide for effective sealing of the side port 115. Only negligible volume of fluids may accumulate below the plug 302. By one turn of the plug, the O-ring 314 unseals the path through grove the grove 316. After releasing the pressure the plug may be safely unscrewed.

The ball valve assembly 102 is retained in the housing 110 by a securing mechanism comprising a split ring 182, a support ring 184, and a snap ring 107. The split ring 105, which may include a plurality of ring segments, is received into groove 116 of the housing 110. The split ring 182 segments may be placed down into the passage 116 above an intermediate ring 146 one at a time, and then moved radially outward into the groove 116. After the segments of the split ring 182 are in the groove 116, the support ring 184 is placed to be radially inside of the split ring 182. The support ring 184 helps to prevent the segments of the split ring 182 from moving radially inward. A snap ring 185 may be used to fix the support ring 184 in place. The snap ring 185 is radially compressed, placed in alignment with the groove 186 in the split ring 182, and released to radially expand into groove 186. Those having ordinary skill in the art will appreciate that other securing mechanisms, such as set screw, may be used instead of the snap ring 185 without departing from the scope of the present invention.

Figure 4:
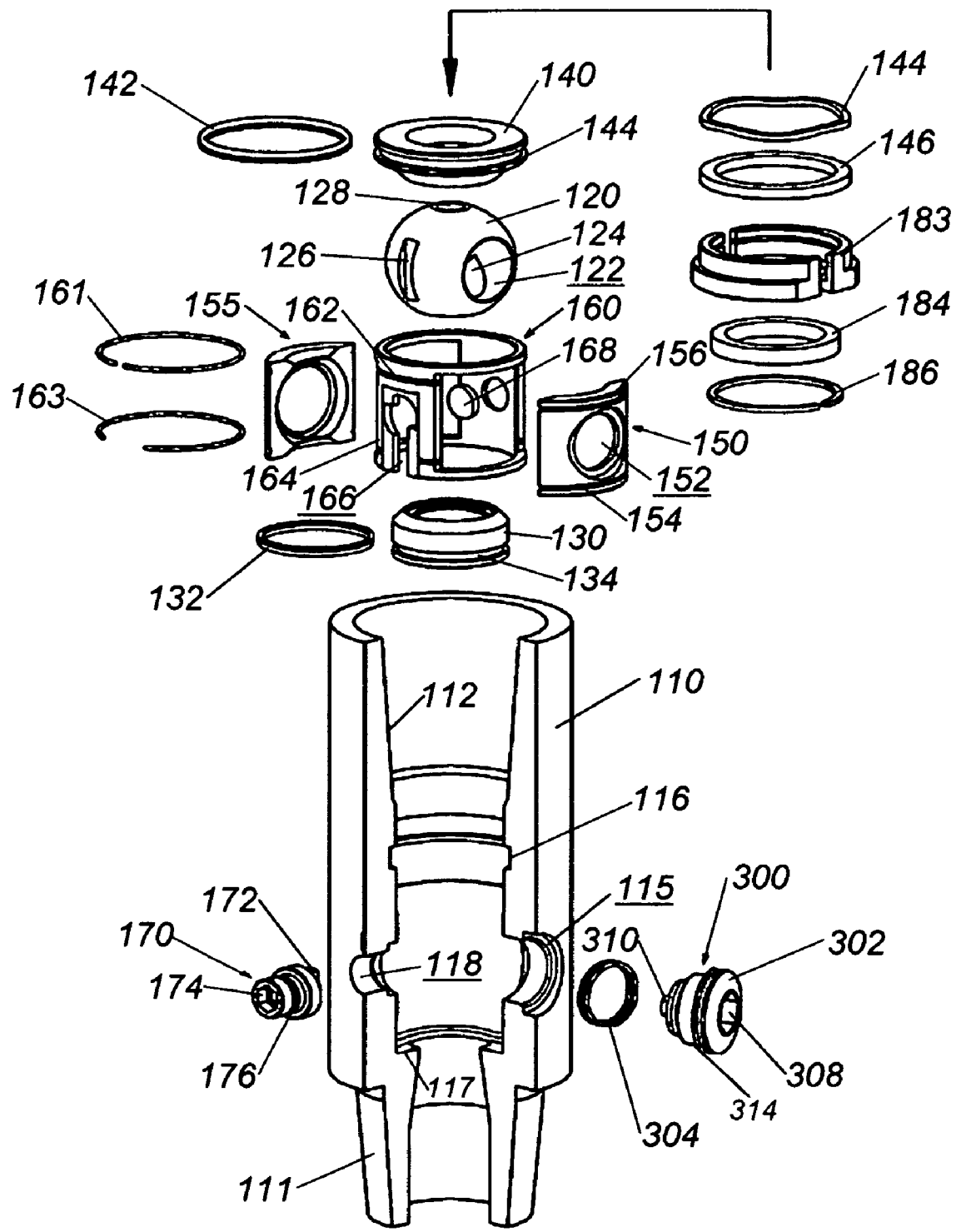
FIG. 4 is an exploded view a continuous flushing valve

FIG. 4 is an isometric exploded view of the continuous flushing valve 100 and provides the possibility to show some details, which could not be seen on FIG. 2, and to explain an assembling process.

A housing 110 has a threaded pin end 111 and a threaded box end 112. A threaded opening 115 may be closed with a plug assembly 300 which comprises a plug 302 with an O-ring 314, a spring 318, and an O-ring 314. The plug has a wrench opening 308 and a locking stem 310.

An opening 118 receives an operating stem assembly 170. The stem assembly comprises a tong 172, a wrench opening 174, an O-ring 176.

The valve ball 120 has an axial opening 122 and a transverse opening 124. The tong 172 of the stem fits into a groove 126 of a valve ball 120 such that the valve ball may be operated by rotating the stem 170 with a wrench (not shown).

An O-ring 132 fits into a recess 134 of a lower seat 130.

A holder 160 has windows which are adapted to host an open side sealing seat 150 and a death side sealing seat 155. A stem opening 166 is located transverse to the windows. The stem opening 166 is of width which fits to a width of the tong 172 of the operating stem 170. A disk 168 limits transverse movements of a valve ball 120 inside the holder. A groove 162 and a groove 164 of the holder are in alignment with grooves 154,156 of an open side seat 150, and appropriate grooves of the death side seat 155. Spring rings 161,163 fit into the grooves of the holder 160 and the side seats 150 and 155.

An O-ring 142 fits into a recess 144 of an upper seat 140.

Other parts will be shown along with a mounting process.

The lower seat 130 with the O-ring in a recess 134 is placed on a shoulder 117 of the housing 110. The operating stem assembly 170 is placed into an opening 118 of the housing 110, with a tong 172 positioned along the axis of the housing. The valve ball 120 is placed into the holder. The side seats 150 and 155 are put into the appropriate windows of the holder. The spring rings 161 and 163 are placed into appropriate grooves of the holder 160 and site seats 150, 155 making up a holder assembly. The holder assembly is placed into the housing. The upper seat 140 is placed on the valve ball, followed by a wave spring 144 and a ring 146. A split ring 182 is placed into the recess 116 of the housing 110. A support ring 184 is placed to be radially inside the split ring. A snap ring 186 is placed into a groove 183 of the split ring 187. The valve ball is put in axial flow position, with site port closed as it is shown on FIG. 2. At the end, the plug 302 is screwed into the side port 115. Continuous flushing valve is in position shown on FIG. 2

Those skilled in the art will appreciate that there may be other embodiments of the invention which do not depart from the scope of the invention as disclosed herein. The housing of the valve may be made from two parts, the side sealing seats may be placed in appropriate groves cut inside the housing, the sealing surfaces of seats may have O-rings, the outer surfaces of side seats may have means for enhanced sealing contacts, the connector may have not a flange, but other connecting means known in the art. In alternative embodiment, the plug assembly may have a venting valve. The scope of the invention should be limited only by the attached claims.

What I claim as my invention is:

1. A continuous flushing valve assembly comprising: a housing a housing arranged along a central axis, said housing having an axial passage therethrough and a side passage centrally aligned with said central axis and in communication with the axial passage, and a stem opening, said side passage threaded to form a side port of the continuous flushing valve, wherein the housing is adapted for including in a drill string having a lower and an upper threaded end, said housing further comprising a shoulder configured to receive a lower seat assembly, said lower seat assembly configured to receive a valve assembly, a valve stem insertable into said stem opening and configured to engage said valve assembly to rotate a valve ball in said valve assembly;

said lower seat assembly comprising: a lower seat with cylindrical through passage, a lower seat o-ring arranged on said lower seat; said lower seat configured to seal against said housing axial passage when arranged on said shoulder, said lower seat assembly configured to support said valve assembly;

said valve assembly comprising: a unitary holder configured to seal against said housing axial passage and comprising a first side seat window, second side seat window, a stem opening, and an operating disk seat configured to limit transverse movement of said valve ball; a first side seat and second side seat, each of said first and second side seats arranged in said first side seat window and said second side seat window respectively, and arranged diametrically opposed to one another so that when said valve assembly is seated on said lower seat assembly, said first side seat is centrally aligned with said side passage, said first side seat comprising a seat opening configured to align with said side passage; the valve ball arranged in the holder, said valve ball having a through hole and a hole transverse to the through hole, when said valve assembly is inserted into said housing, said valve ball is configured to rotate between at least two positions, wherein in a first position the valve ball permits fluid flow between the ends of the housing and in a second position permits flow between the side passage and the lower end of said housing;

said valve assembly configured to support an upper seat assembly;

said upper seat assembly comprising: an upper seat configured to seal against said housing axial passage and seat on top of said valve assembly; a wave spring configured to seat on top of said upper seat and configured to support an intermediate o-ring supporting a split ring and a snap ring, said wave spring keeping said valve ball in sealing contact with said upper and lower seat assembly;

a plug assembly with a locking stem said plug assembly detachably threaded into the side port of the continuous flushing valve, said plug assembly comprising a vent groove operably sealed by a plug o-ring; said plug assembly configured to release a pressure build up in said plug assembly when said plug o-ring is unsealed from said vent groove.

2. The continuous flushing valve assembly of claim 1, wherein at least one of the upper seat assembly and the lower seat assembly is biased towards the valve ball by said spring.

3. The continuous flushing valve assembly of claim 1, wherein the exterior of each of the first side sealing seat and said second side sealing seat is of a shape that fits an inside a cylindrical surface of the housing.

4. The continuous flushing valve assembly of claim 1, wherein, said stem opening is of a width of a tong of the the valve stem, thereby said stem opening and said tong keep the holder and the valve ball in a predefined position.

5. The continuous flushing valve assembly of claim 1, wherein, the locking stem comprises a short stem located at the bottom of the plug assembly and a hole on the surface of the valve ball, said short stem fits into said hole on the surface of the valve ball, thereby the valve ball is kept in stable axial flow position when the plug assembly is screwed into the side port opening.

* * * * *